Figure 11:
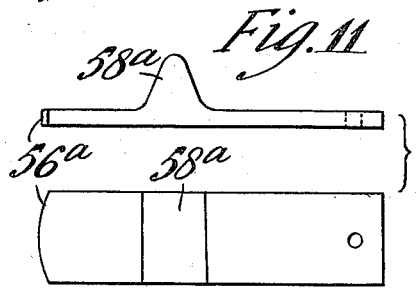

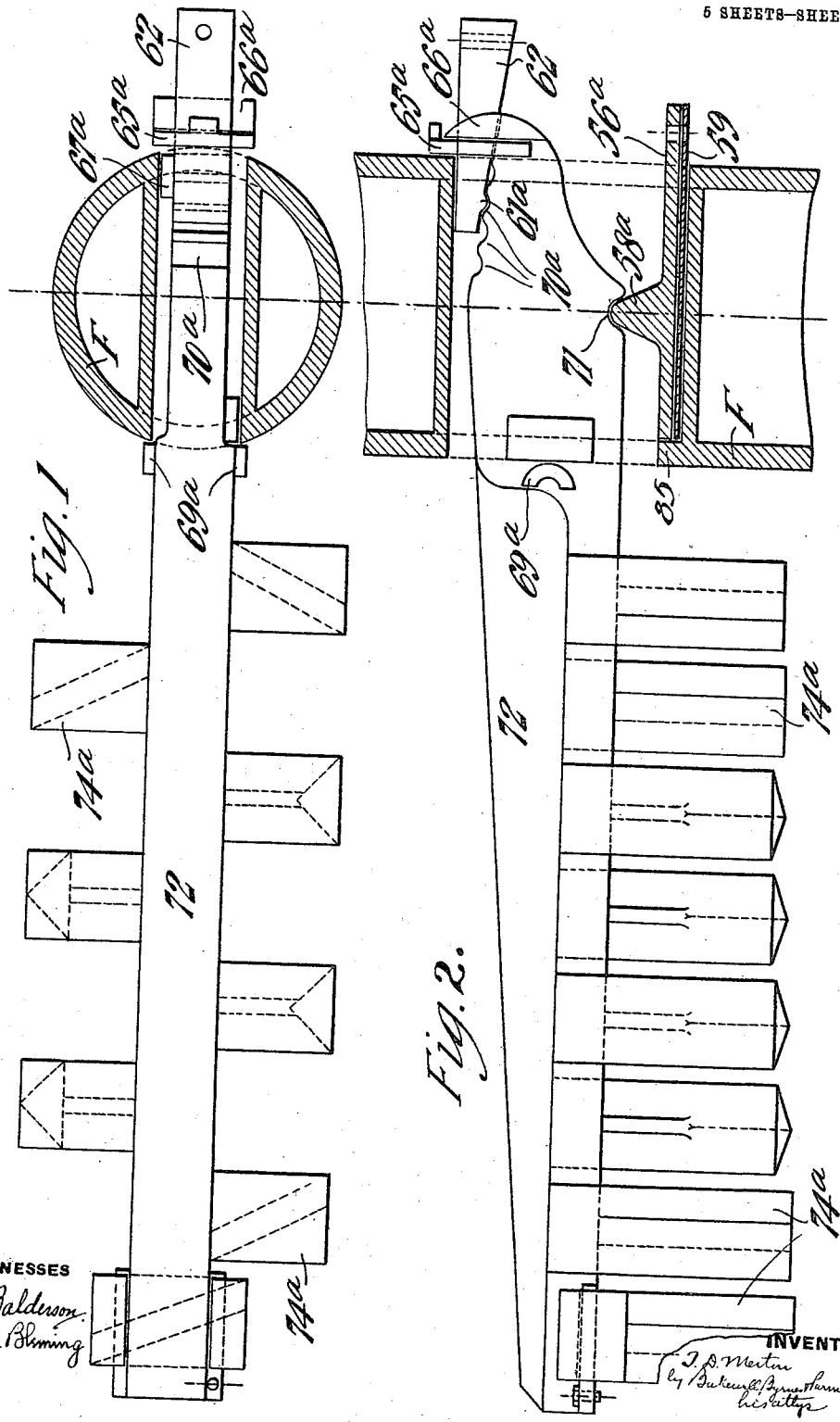

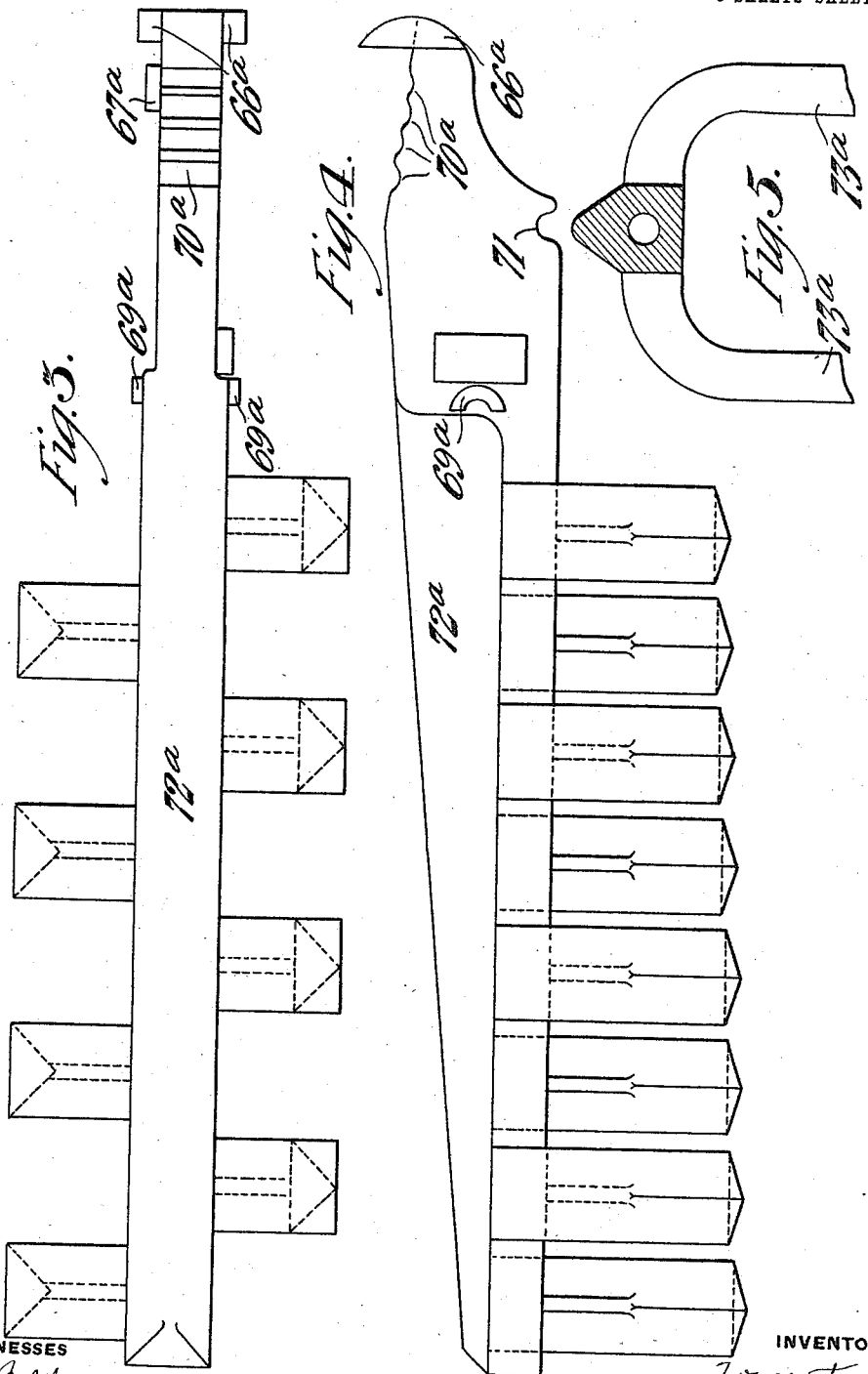

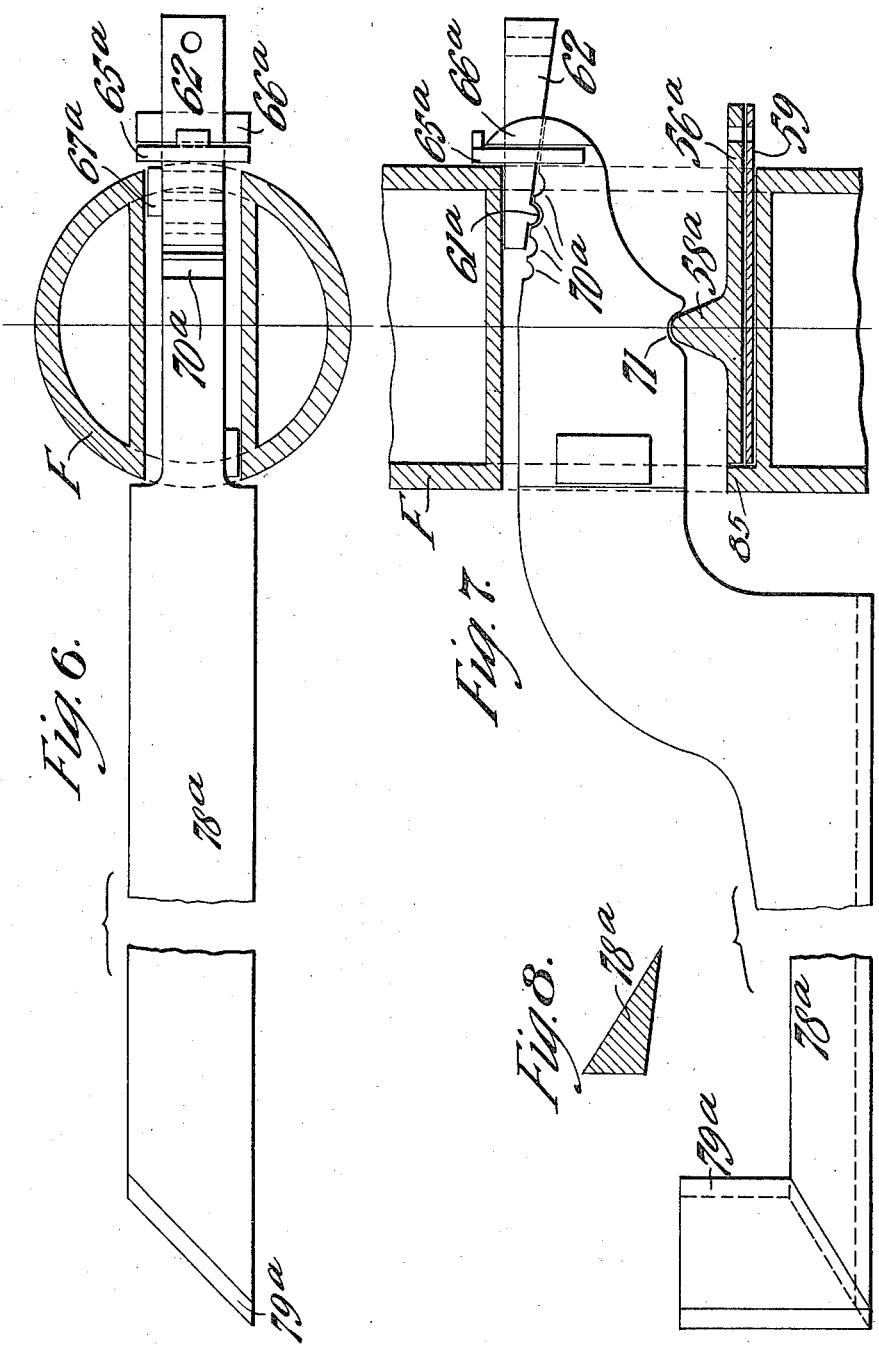

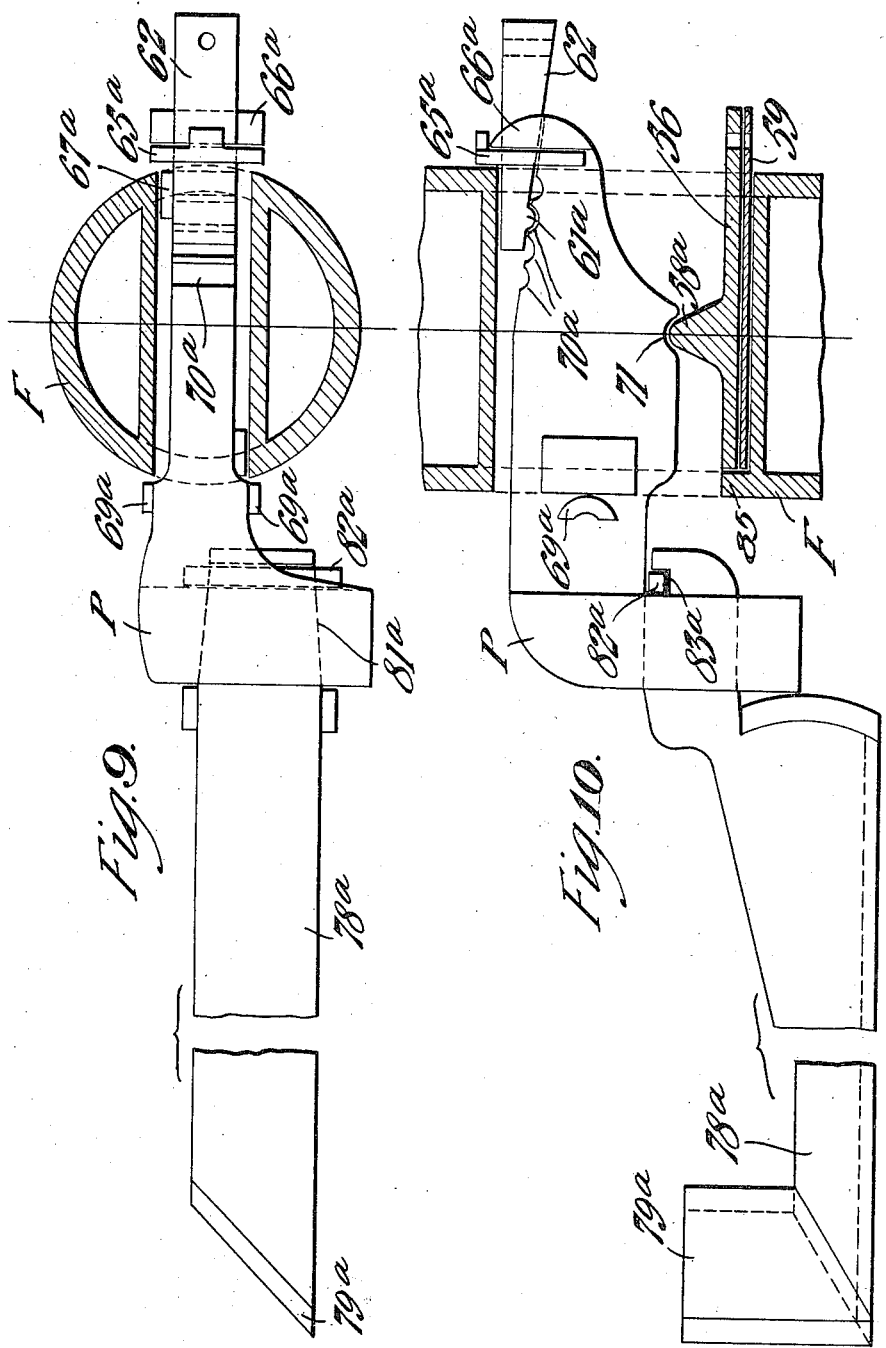

T. D. MERTON.
RABBLE SHAFT, ARMS, AND PLOWS FOR ROASTING FURNACES.
APPLICATION FILED JAN. 29, 1910.

1,068,518.

Patented July 29, 1913.
5 SHEETS—SHEET 5.

WITNESSES
R. A. Balderson
G. B. Blaming

INVENTOR
T. D. Merton
By Bakewell, Byrnes, Parmelee
his attys

COLUMBIA PLANOGRAPH CO., WASHINGTON, D. C.

UNITED STATES PATENT OFFICE.

THOMAS DANIELLS MERTON, OF GROVE MILL, WATFORD, ENGLAND, ASSIGNOR OF ONE-HALF TO HARRY MacKENZIE RIDGE, OF LONDON, ENGLAND.

RABBLE SHAFT, ARMS, AND PLOWS FOR ROASTING-FURNACES.

1,068,518.     Specification of Letters Patent.     Patented July 29, 1913.

Application filed January 29, 1910. Serial No. 540,764.

*To all whom it may concern:*

Be it known that I, THOMAS DANIELLS MERTON, a subject of the King of Great Britain, residing at Grove Mill, Watford, in the county of Herts, England, metallurgist, have invented certain new and useful Improvements in Rabble Shafts, Arms, and Plows for Roasting-Furnaces, of which the following is a specification.

This invention relates to improvements in the construction of rabble shafts and arms for roasting furnaces, for desulfurizing, sulfating, and oxidizing finely crushed materials, with the view of overcoming faults found in existing rabble shafts and arms, and consists in the novel arrangement and combination of parts hereinafter more fully set forth, and as illustrated in the drawings.

The object of my invention is to improve the construction of rabble shafts, and the means of adjusting the rabbles attached thereto.

It is obvious that with ores high in sulfur, the heat generated in a furnace varies considerably, and that the increase or decrease of temperature in a furnace causes expansion or contraction of the brickwork in a corresponding degree, and that where a plurality of superimposed hearths is subjected to these variations in temperature, adjustability of rabbles is of great importance.

Figure 12:
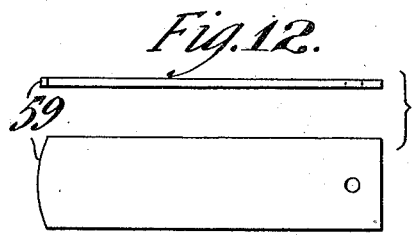
Figure 13:
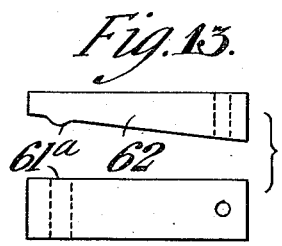
Figure 14:
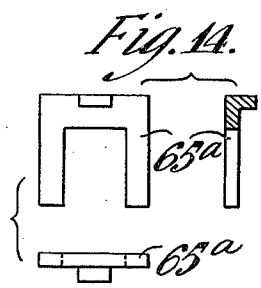
Figure 15:
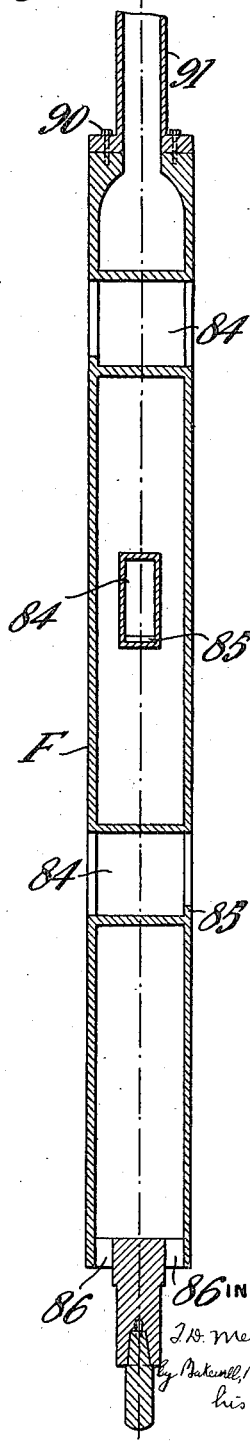

In the accompanying drawings:—Figures 1 and 2 show the top plan and elevation of an uncooled rabble arm, with plain and oblique rabbles dependent from same. Figs. 3 and 4 show the top plan and elevation of an uncooled rabble arm, with all plain rabbles. Fig. 5 is a cross section of an uncooled rabble arm, having rabbles cast integral therewith. Figs. 6 and 7 show plan view and elevation of a knife rabble and method of fitting and adjusting same to the rabble shaft. Fig. 8 is a cross section of a knife rabble. Figs. 9 and 10 are top plan and elevation of a knife rabble fitted into a carrier, the latter being adjustable on the rabble shaft in a similar manner to the rabble arm of Figs. 6 and 7. Figs. 11 and 12 show a fulcrum plate and adjusting plate in plan and in elevation. Fig. 13 is a back adjusting tooth bar. Fig. 14 shows front, section and top views of a locking device. Fig. 15 is a vertical section of an air cooled shaft.

Throughout the drawings like letters and numbers of reference refer to like parts.

To provide for the objects in view, I have designed a hollow rabble shaft F, Fig. 15, made of cast iron, preferably in one piece, having openings 86 above the footstep for the admission of cold air, which rises through the shaft to exit pipe 91. The rectangular transverse openings or passages 84 correspond with the number of hearths in the furnace and are centrally positioned through the shaft; each passage is of sufficient vertical height to permit the head of the rabble arms 72, $72^a$ (Figs. 1 to 4) or knife edge rabble $78^a$ (Figs. 6–8) or rabble carrier P (Figs. 9—10) to be raised or lowered as required. The rabble arms are constructed so that each can readily be adjusted independently of each other to suit the requirements of the individual hearths.

The heads of the rabble arms or carriers (Figs. 1–4, 6–10) are formed with a transverse groove 71 on the under side, which embraces a tooth $58^a$ integral with the bed plate $56^a$ forming a fulcrum. The latter is raised or lowered by means of the adjusting plate or plates 59 which can be made in varying thicknesses, forward movement of same being prevented by a stop 85 cast integral with shaft F, (Figs. 7, 10, 15) and the wedge 63 being correspondingly adjusted to prevent tilting of the rabble arm. The top back part of the head has transverse grooves $70^a$ on a bevel face; this enables the wedge or tapered bar 62 having a transverse tooth $61^a$, to engage any one of the grooves $70^a$, and by so doing instantly raises or lowers the toe end of rabble arm or carrier. My object is to enable the end rabbles to be made longer than the rabbles toward the shaft, because the wear on the outer rabbles is much greater than on the inner ones, and as the outer rabbles wear, the toe of rabble or rabble carrier can be lowered, and their period of usefulness proportionately extended. On the top back part of head there is a lug $66^a$, which by the weight of rabble or rabble carrier acting from fulcrum $58^a$, at once, by means of locking plate $65^a$, grips the shaft firmly in working position. For lead-zinc ores, I use the knife rabble $78^a$, (Figs. 6–10) with a cutting edge which removes any caking of the ores from the hearths. This rabble can be made in one solid piece, as shown in Figs. 6—7, or shortened to fit a carrier P, Figs. 9—10; in the latter the head of the knife rabble 78ª, fits a tapered passage 81ª formed in the carrier, and has on its top back part a square groove 83ª, into which the square key piece 82ª fits securely, and so prevents the rabble from coming out of the carrier. These rabbles are made to work right and left handed, and as the tendency is to carry the ore to the periphery, in increasing ratio to the increase of speed of rabble shaft, I have placed an oblique vertical plate 79ª to scoop in the ore. The side lugs 67ª on head keep the rabble or rabbles in line, and convey the working pressure of rabble to the strongest parts of the shaft; the lugs 69ª prevent backward movement of head.

In Figs. 1 and 2 I have shown a rabble arm with rabbles cast integral with same; the one at the toe is an adjustable oblique rabble, and the other oblique rabbles 74ª are for deflecting the ore to a central discharge on the furnace hearth; Figs. 3–5 show a rabble arm with diamond shaped rabbles all cast integral with same; Fig. 5 shows how the rabbles 73ª are positioned, and Fig. 3 how they are staggered; the combination enables a perfect rabbling of the ore.

Having now described the nature of my said invention and the best means I know of carrying the same into practical effect, I claim:

1. A hollow rabble shaft, rabble arms projecting from and adjustably mounted upon said shaft and means for adjusting the height of a rabble arm with respect to the ends of the shaft.

2. A hollow rabble shaft, rabble arms projecting from and adjustably mounted upon said shaft, and means for adjusting the inclination of an arm with the shaft.

3. A hollow rabble shaft, rabble arms projecting from and adjustably mounted upon the said shaft, the head of each of said rabble arms being formed with a transverse groove on its under side and the rabble shaft being formed with a socket for the reception of the head of the rabble arm, a sole plate fitting within said socket and having a fulcrum coöperating with the transverse groove on the underside of the rabble arm, means for raising or lowering the sole plate, and a wedge coöperating with the head of the rabble arm to maintain the latter horizontally.

4. A hollow rabble shaft formed with a socket, a rabble arm projecting from and pivotally mounted within the socket, the arm having a grooved upper surface at its inner end, a wedge interposed between the upper side of the socket and the said surface and having a tooth on its tapered face and adapted to engage said grooves whereby the inclination of rabble arm with the shaft may be altered.

In testimony whereof I have signed my name to this specification in the presence of two subscribing witnesses.

THOMAS DANIELLS MERTON.

Witnesses:
 JOSEPH MILLARD,
 GEO. W. FRANKLIN.

---

Copies of this patent may be obtained for five cents each, by addressing the "Commissioner of Patents, Washington, D. C."